(12) United States Patent
Grein et al.

(10) Patent No.: US 7,786,204 B2
(45) Date of Patent: Aug. 31, 2010

(54) PROPYLENE POLYMER COMPOSITION

(75) Inventors: Christelle Grein, Linz (AT); Markus Gahleitner, Neuhofen/Krems (AT)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 11/988,753

(22) PCT Filed: Jun. 13, 2006

(86) PCT No.: PCT/EP2006/005666

§ 371 (c)(1),
(2), (4) Date: Nov. 7, 2008

(87) PCT Pub. No.: WO2007/009534

PCT Pub. Date: Jan. 25, 2007

(65) Prior Publication Data

US 2009/0082509 A1  Mar. 26, 2009

(30) Foreign Application Priority Data

Jul. 19, 2005  (EP) .................. 05015697

(51) Int. Cl.
C08K 3/26 (2006.01)
(52) U.S. Cl. .................................. 524/426
(58) Field of Classification Search .......... 524/426
See application file for complete search history.

(56) References Cited

U.S. PATENT DOCUMENTS

| 5,169,712 | A | 12/1992 | Tapp |
| 5,236,963 | A | 8/1993 | Jacoby et al. |
| 5,310,584 | A | 5/1994 | Jacoby et al. |

FOREIGN PATENT DOCUMENTS

| DE | 36 10 644 | 10/1986 |
| EP | 177 961 | 4/1986 |
| EP | 682 066 | 11/1995 |
| EP | 1 344 793 | 9/2003 |
| EP | 1 344 793 A1 * | 9/2003 |
| EP | 1 364 986 | 11/2003 |

OTHER PUBLICATIONS

A. Turner Jones, et al., Crystalline Forms of Isotactic Polypropylene, Makromol. Chem., 75 (1964) pp. 134-158.

* cited by examiner

*Primary Examiner*—Robert D. Harlan
(74) *Attorney, Agent, or Firm*—Milbank, Tweed, Hadley & McCloy LLP

(57) ABSTRACT

A propylene polymer composition having a high impact strength and a high stiffness for the manufacture of parts having an excellent surface quality comprising A) 70 to 98 wt.-% of a heterophasic propylene copolymer with ethylene or an alpha-olefin with 4 to 12 carbon atoms, the propylene copolymer, which contains more than 60 wt.-% propylene, having a melt flow rate ($MFR_2$) of 0.5 to 50 g/10 min and a ratio between elastomer molecular weight and total molecular weight expressed as $M_w/M_w$ (XCS) of more than 0.8, $M_w$ being the weight average molecular weight of the propylene copolymer and $M_w$(XCS) being the weight average molecular weight of the propylene copolymer which is soluble in xylene at +23° C., and the propylene copolymer further containing a portion of 5 to 35 wt.-% soluble in xylene at +23° C. (XCS content), B) 2 to 30 wt.-% of a mineral filler,
C) 0.0001 to 1.0 wt.-% of a β-nucleating agent promoting the β-modification of the propylene copolymer, said composition having a content of β-modification of more than 50% determined by differential scanning calorimetry (DSC) and an impact strength at −20° C. which is at least 50% higher than the impact strength of the propylene copolymer (A).

18 Claims, No Drawings

PROPYLENE POLYMER COMPOSITION

This application is a national stage application of International Application No. PCT/EP2006/005666, filed Jun. 13, 2006, the contents of which are hereby incorporated in their entireties and claims the priority to EP 05015697.5, filed Jul. 19, 2005.

The present invention relates to a propylene polymer composition comprising a heterophasic propylene copolymer having a high content of β-modification and containing a mineral filler.

The heterophasic polypropylene copolymers comprise a polypropylene matrix containing particles of e.g. ethylene-propylene rubber. Because of their high toughness, they are also known as impact polypropylenes.

Propylene polymer compositions are used for various technical applications. DE 36 10 644 A1 discloses a β-crystalline isotactic polypropylene having a content of β-modification of 85 to 93%. As β-nucleating agent 0.2 wt.-% calcium carbonate with an equal amount of adipic acid is used. The polyolefin composition of EP 1 344 793 A1 comprises a heterophasic copolymer, β-nucleating agent and talc as filler. U.S. Pat. No. 5,169,712 and U.S. Pat. No. 5,236,963 disclose a microporous film comprising an ethylene/propylene block copolymer with 10 to 50 wt.-% ethylene and a melt flow rate ($MFR_2$) of 1.0 g/10 min, a polypropylene homopolymer with a $MFR_2$ of 1.8 to 2.7 g/10 min, a low molecular weight polypropylene, a β-nucleating agent and calcium carbonate with a particle size of 0.8 μm. The thermoformable sheet according to U.S. Pat. No. 5,310,584 comprises a propylene polymer with up to 40 mol-% ethylene or an alpha-olefin with 4 to 12 carbon atoms having a content of β-modification of 30 to 95%. Besides a β-nucleating agent, the sheet comprises mineral materials as whiteners or opacifiers, such as $TiO_2$ and $CaCO_3$ in an amount of 0.5 to 5 wt.-%.

EP 1 364 986 A1 discloses a propylene polymer composition for pipes, e.g. as used in piping systems having a high tensile modulus, impact strength, flexural strength, ring stiffness and elongation at break. The composition comprises 90.0 to 99.9 wt.-% of an heterophasic propylene copolymer with ethylene or an alpha-olefin with 4 to 18 carbon atoms with a melt flow rate of 0.05 to 20 g/10 min, 1 to 70% of a mineral filler, as talc or calcium carbonate, and a β-nucleating agent to promote the β-modification of the propylene copolymer.

Propylene polymer compositions are widely used for housings or other components of small appliances, in particular household appliances, e.g. vacuum cleaners, mixers or coffee machines or white goods as washing machines, fridges, fridge-freezers or dish-washers.

However, for these applications, propylene polymer compositions often suffer from shortcomings in the combination of stiffness, toughness and surface quality. The known compositions are unable to solve these problems simultaneously:
- the addition of mineral fillers leads to a deterioration of toughness while increasing stiffness,
- the selective promotion of the β-modification reduces the stiffness while increasing toughness,
- the addition of chemically coupled glass fibers increases both stiffness and toughness, but reduces the surface quality significantly.

Therefore, it is the object of the present invention to provide a propylene polymer composition, in particular for the manufacture of components of small appliances and white goods, having the required stiffness, toughness and surface quality.

This object is obtained with a propylene polymer composition comprising
A) 70 to 98 wt.-% of a heterophasic propylene copolymer with ethylene or an alpha-olefin with 4 to 12 carbon atoms, the propylene copolymer, containing more than 60 wt.-% of propylene, having a melt flow rate ($MFR_2$) of 0.5 to 50 g/10 min and a ratio between elastomer molecular weight and total molecular weight expressed as $M_w/M_w(XCS)$ of >0.8

$M_w$ being the weight average molecular weight of the propylene copolymer and $M_w(XCS)$ being the weight average molecular weight of the propylene copolymer which is soluble in xylene at +23° C. and the propylene copolymer further containing a portion of 5 to 35 wt.-% soluble in xylene at +23° C. (XCS content),
B) 2 to 30 wt.-% of a mineral filler,
C) 0.0001 to 1.0 wt.-% of a β-nucleating agent promoting the β-modification of the propylene copolymer, said composition having a content of r-modification determined by differential scanning calorimetry (DSC) of more than 50% and an impact strength at −20° C. which is at least 50% higher than the impact strength of the propylene copolymer (A).

Surprisingly, it has been found that parts made of such a propylene polymer composition do not only have a high toughness, but also a high stiffness and an excellent surface quality.

The melt flow rate ($MFR_2$), the molecular weight, the content of β-modification and the impact strength are measured as stated below in "Description of the measurement methods".

Preferably, the propylene copolymer (A) is a copolymer of propylene and ethylene. Its melt flow rate is preferably less than 15 g/10 min, in particular 10 g/10 min or less.

The $M_w/M_w(XCS)$ ratio of propylene copolymer (A) is more than 0.8. When the $M_w/M_w(XCS)$ ratio is less than 0.8, the propylene polymer composition shows a significant decrease in its impact strength as well as in the flexural strength compared with propylene copolymer (A) (without a mineral filler and β-nucleating agent). Good results are obtained when the $M_w/M_w(XCS)$ ratio is between 0.85 and 5.

The XCS content of the propylene copolymer (A) is between 5 and 35 wt.-%, preferably less than 30 wt.-%, in particular less than 25 wt.-%.

The mineral filler has preferably a weight average particle size of 2 μm or less, preferably less than 1 μm, and preferably more than 10 nm, in particular more than 100 nm. The particle size is determined as stated below in "Description of measurement methods".

Fillers with an approximately isotropic particle size, that means particles with an aspect ratio between 1:2 and 2:1, in particular about 1, are preferred.

The filler should have no alpha-nucleating activity. For this reason, talc is not appropriate for the present invention. On the other hand, good results are obtained when calcium carbonate is used as filler. The calcium carbonate may be ground or precipitated, for instance by introducing carbon dioxide into a calcium hydroxide solution.

Unexpectedly, when both the filler and the β-nucleating agent are added to the propylene copolymer, a considerable increase of the stiffness, i.e. the flexural modulus, and of the toughness, i.e. the impact strength particularly at sub zero temperatures are attained. Thus, the impact strength of the propylene polymer composition of the invention at −20° C. is at least 100%, in particular more than 200% higher than the impact strength of the propylene copolymer (A), and the propylene polymer composition has an impact strength at −20° C. preferably of more than 4 kJ/m². On the other hand, the flexural modulus of the propylene polymer composition of the invention is at least 1000 MPa.

A characteristic value for the improvement attained by the present invention is the sum of the percent increases of the impact strength at +23° C., the impact strength at −20° C. and the flexural modulus of the propylene polymer composition of the invention compared with the propylene copolymer (A) used to prepare the composition. This value, which is called "delta total", is preferably at least 150%, in particular more than 300%.

For promoting the β-modification of the propylene copolymer, the propylene polymer composition of the invention contains at least 0.0001 to 1.0 wt.-% of a β-nucleating agent, preferably at least 0.01 wt.-%, in particular at least 0.05 wt.-%. As β-nucleating agent any nucleating agent can be used which is suitable for inducing crystallization of propylene homo-and copolymers in the hexagonal or pseudohexagonal modification. Mixtures of such nucleating agents may also be employed.

Suitable types of β-nucleating agents are dicarboxylic acid derivative type diamide compounds from $C_5$-$C_8$-cycloalkyl monoamines or $C_6$-$C_{12}$-aromatic monoamines and $C_5$-$C_8$-aliphatic, $C_5$-$C_8$cycloaliphatic or $C_6$-$C_{12}$-aromatic dicarboxylic acids, e.g.

N,N'-di-$C_5$-$C_8$-cycloalkyl-2,6-naphthalene dicarboxamide compounds such as N,N'-dicyclohexyl-2,6-naphthalene dicarboxamide and N,N'-dicyclooctyl-2,6-naphthalene dicarboxamide, N,N'-di-$C_5$-$C_8$-cycloalkyl-4,4-biphenyldicarboxamide compounds such as N,N'-dicyclohexyl-4,4-biphenyldicarboxamide and N N'-dicyclopentyl-4,4-biphenyldicarboxamide, N,N'-di-$C_5$-$C_8$-cycloalkyl-terephthalamide compounds such as N,N'-dicyclohexylterephthalamide and N,N'-dicyclopentylterephthalamide, N,N'-di-$C_5$-$C_8$-cycloalkyl-1,4-cyclohexanedicarboxamide compounds such as N,N'-dicyclo-hexyl-1,4-cyclohexanedicarboxamide and N,N'-dicyclohexyl-1,4-cyclopentanedicarboxamide, diamine derivative type diamide compounds from $C_5$-$C_8$-cycloalkyl monocarboxylic acids or $C_6$-$C_{12}$-aromatic monocarboxylic acids and $C_5$-$C_8$cycloaliphatic or $C_6$-$C_{12}$-aromatic diamines, e.g.

N,N'—$C_6$-$C_{12}$-arylene-bis-benzamide compounds such as N,N'-p-phenylene-bis-benzamide and N,N'-1,5-naphthalene-bis-benzamide, N,N'—$C_5$-$C_8$-cycloalkyl-bis-benzamide compounds such as N,N'-1,4-cyclopentane-bis-benzamide and N,N'-1,4-cyclohexane-bis-benzamide, N,N'-p-$C_6$-$C_{12}$-arylene-bis-$C_5$-$C_8$-cycloalkylcarboxamide compounds such as N,N'-1,5-naphthalene-bis-cyclohexanecarboxamide and N,N'-1,4-phenylene-bis-cyclohexanecarboxamide, and N,N'—$C_5$-$C_8$-cycloalkyl-bis-cyclohexanecarboxamide compounds such as N,N'-1,4-cyclopentane-bis-cyclohexanecarboxamide and N,N'-1,4-cyclohexane-bis-cyclohexanecarboxamide, amino acid derivative type diamide compounds from amidation reaction of $C_5$-$C_8$alkyl, $C_5$-$C_8$-cycloalkyl-or $C_6$-$C_{12}$-arylamino acids, $C_5$-$C_8$-alkyl-, $C_5$-$C_8$-cycloalkylor $C_6$-$C_{12}$-aromatic monocarboxylic acid chlorides and $C_5$-$C_8$-alkyl-, $C_5$-$C_8$cycloalkyl-or $C_6$-$C_{12}$-aromatic mono-amines, e.g.

N-phenyl-5-(N-benzoylamino)pentane amide and N-cyclohexyl-4-(N-cyclohexyl-carbonylamino)benzamide.

Further suitable β-nucleating agents are quinacridone type compounds, e.g. quinacridone, dimethyl quinacridone and dimethoxyquinacridone, quinacridonequinone type compounds, e.g. quinacridonequinone, a mixed crystal of 5,12-dihydro(2,3b)acridine-7,14-dione with quino(2,3b)acridine-6,7,13,14-(5H, 12H)-tetrone and dimethoxyquinacridonequinone and dihydroquinacridone type compounds, e.g. dihydroquinacridone, dimethoxydihydroquinacridone and dibenzodihydroquinacridone.

Still further suitable β-nucleating agents are dicarboxylic acid salts of metals from group IIa of periodic table, e.g. pimelic acid calcium salt and suberic acid calcium salt; and mixtures of dicarboxylic acids and salts of metals from group IIa of the periodic table.

Still further suitable β-nucleating agents are salts of metals from group IIa of periodic system and imido acids of the formula

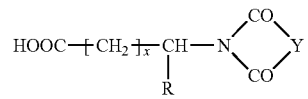

wherein x=0 to 4; R=H, —COOH, $C_1$-$C_{12}$-alkyl, $C_5$-$C_8$-cycloalkyl or $C_6$-$C_{12}$-aryl, and Y=$C_1$-$C_{12}$-alkyl, $C_5$-$C_8$-cycloalkyl or $C_6$-$C_{12}$-aryl-substituted bivalent $C_6$-$C_{12}$-aromatic residues, e.g.

calcium salts of phthaloylglycine, hexahydrophthaloylglycine, N-phthaloylalanine, phthalimidoacetate and/or N-4-methylphthaloylglycine.

Preferred β-nucleating agents are any one or mixtures of N,N'-dicyclohexyl-2,6-naphtalene dicarboxamide, the β-nucleating agents of EP 177961 and those of EP 682066.

Particularly preferred β-nucleating agents are any one or mixtures of a mixed crystal of 5,12-dihydro-quino(2,3-b) acridine-7,14-dione with quino(2,3-b)acridine-6,7,13,14 (5H, 12H)tetrone, N,N'-dicyclohexyl-2,6-naphtalene dicarboxamide and salts of dicarboxylic acids with at least 7 carbon atoms with metals of group IIa of the periodic table.

These β-nucleating agents are characterized by very high activity. Calcium pimelate is still more preferred as β-nucleating agent because it combines a very high activity with being completely colorless and it is very inexpensive.

Particularly good results can be obtained when the nucleating agent is used as coating on the particles of the filler. Such coated particles can for example be prepared by precipitation from a calcium hydroxide solution in the presence of a dicarboxylic acid with at least 7 carbon atoms like pimelic or suberic acid.

The composition of the invention has a content of β-modification of more than 50%, preferably more than 80%, in particular 80 to 95% as calculated from DSC.

The propylene polymer composition of the invention may further comprise conventional additives, such as anti-oxidants, stabilizers, acid scavengers, clarifying agents, coloring agents, anti-UV agents, anti-static agents, mold release agents, etc. Typically, these additives may be present at less than 2 wt.-% each, more preferably less than 0.05 wt.-% relative to the total weight of the composition.

The propylene polymer composition of the invention is particularly useful for the manufacture of housings and other components of household appliances, as vacuum cleaners, mixers, coffee machines and the like, or white goods, e.g. washing machines, fridges, fridge-freezers and dish washers. Due to the excellent mechanical and thermo-mechanical properties of the polymer compositions, they are also suitable for producing articles for automotive, electric and electronic appliances and other technical applications. The housing parts and other articles may be produced by employing conventional injection molding, blow molding, compression or back compression molding, thermoforming and/or extrusion techniques.

Production of Heterophasic Propylene Copolymer (A)

The propylene copolymer may be produced by single-or multistage process polymerization of propylene and alpha-olefin and/or ethylene such as bulk polymerization, gas phase polymerization, slurry polymerization, solution polymerization or combinations thereof using conventional catalysts. Those processes are well known to one skilled in the art.

A preferred process is a combination of bulk slurry loop reactor(s). The copolymer can be made either in loop reactors or in a combination of loop and gas phase reactor. The polymer produced in this way may be transferred into another reactor, where e.g. a different propylene polymer is polymerized on top of the product of the first reactor, e.g. when propylene alpha-olefin rubber is polymerized. Preferably, this polymerization step is done in a gas phase polymerization.

A suitable catalyst for the polymerization of the propylene copolymer is any stereospecific catalyst for propylene polymerization which is capable of copolymerising propylene and comonomers at a temperature of 40 to 110° C. and at a pressure from 10 to 100 bar. Ziegler Natta catalysts as well as metallocene catalysts are suitable catalysts.

One skilled in the art is aware of the various possibilities to produce propylene copolymers and will simply find out a suitable procedure to produce suitable polymers which are used in the present invention.

The resulting polymer particles may be pelletised in a conventional compounding extruder with various additives, which are generally used in thermoplastic polymer compositions, such as stabilizers, antioxidants, acid neutralizing agents, ultraviolet absorbers, clarifying agents, antiblocking agents, antistatic agents, antifogging agents, etc. Said polymer particles may also be combined directly in a melt mixing operation with the filler and β-nucleating agent specified in the present application.

Description of Measurement Methods

Melt Flow Rate

The melt flow rates (MFR$_2$) were measured with a load of 2.16 kg at 230° C. for polypropylene and at 190° C. for polyethylene. The melt flow rate is that quantity of polymer in grams which the test apparatus standardized to ISO 1133 extrudes within 10 minutes at a temperature of 230° C. or 190° C. respectively, under a load of 2.16 kg.

Comonomer Content

Comonomer contents were measured with Fourier transform infrared spectroscopy (FTIR) calibrated with $^{13}$C—NMR.

Intrinsic Viscosity

Intrinsic viscosity was measured according to DIN ISO 1628-1 (October 1999) in decalin at 135° C.

Charpy Notched Impact Strength

The Charpy notched impact strength (NIS) was determined according to ISO 179/leA at 23° C. and at −20° C. by using injection molded test specimens as described in EN ISO 1873-2 (80×10×4 mm).

Flexural Test

The flexural test was carried out according to the method of ISO 178 by using injection molded test specimens as described in EN ISO 1873-2 (80×10×4 mm).

Content of β-Modification

The β-crystallinity was determined by Differential Scanning Calorimetry (DSC). DSC was run according to ISO 3146/part 3/method C2 with a scan rate of 10° C./min. The amount of β-modification was calculated from the second heat by the following formula:

$$\beta\text{-area}/(\alpha\text{-area}+\beta\text{-area})$$

Since the thermodynamical β-modification starts to be changed into the more stable alpha-modification at temperatures above 150° C., a part of the β-modification is transferred within the heating process of DSC-measurement. Therefore, the amount of β-PP determined by DSC is lower as when measured according to the method of Turner-Jones by WAXS (A. Turner-Jones et. al., Makromol. Chem. 75 (1964) 134).

"Second heat" means that the sample is heated according to ISO 3146/part 3/method C2 for a first time and then cooled to room temperature at a rate of 20° C./min. The sample is then heated a second time, also according to ISO 3146/part 3/method C2. This second heat is relevant for measurement and calculation.

During the "first heat" all thermal history of the sample giving rise to different crystalline structure, which typically comes from different processing conditions and/or methods, is destroyed. Using the second heat for determination of β-crystallinity, it is possible to compare samples regardless of the way the samples were originally manufactured.

Particle Size of Mineral Filler

For the mineral components, the average particle size (usually defined as the median or 50%-quantil of the particle size distribution determined in a normal or laser light scattering analysis) is supplied by the respective suppliers or procedures.

XCS Content

Xylene solubles were determined at 23° C. according to ISO 6427. Xylene solubles are defined as the percent by weight that stays in solution after the polymer sample is dissolved in hot xylene and the solution is allowed to cool to 23° C. XCS largely correlates to the rubber content of the heterophasic polymer.

Molecular Weights

Molecular weights were determined with gel permeation chromatography (GPC), namely from high temperature size exclusive chromatography (SEC) in trichlorobenzene at 135° C.

EXAMPLES

Preparation of Heterophasic Copolymer (A)

The propylene copolymer PP-I1 used for the present invention is prepared according to the following procedure:

Propylene, hydrogen and the components of a catalyst system based on a 4th generation Ziegler-Natta catalyst are fed in appropriate quantities to a slurry loop reactor, where the first polymerization stage is performed as polymerization of a propylene homopolymer in liquid phase at a temperature of 60-90° C. and a pressure of 25-35 bar. The resulting polymer including the still active catalyst is then transferred to a gas phase reactor to which further reactants are fed, in detail a mixture of propylene, ethylene and hydrogen of appropriate composition. In this gas phase reactor, the second polymerization stage is performed as polymerization of a propylene-ethylene copolymer in gas phase at a temperature of 70-100° C. and a pressure of 10-25 bar. After deactivation of the remaining catalyst with steam and drying with hot nitrogen the polymer powder is melt compounded in a twin-screw extruder with appropriate stabilizers and other additives.

Propylene copolymer PP-I1 has a melt flow rate ($MFR_2$) of 1 g/10 min, a weight average molecular weight (MW) of 626, a weight average molecular weight of the XCS content ($M_w$) (XCS) of 349, a $M_w/M_w$(XCS) ratio of 179 and contents 13.8 mol-% ethylene comonomer.

Propylene comonomers PP-I2 and PP-I3 can be prepared according to the above procedure, except that the homopolymer part of the composition can also be polymerized in a sequence of slurry loop and gas phase reactors and that two sequential gas phase reactors can be used for the polymerization of the copolymer part of the composition.

Propylene copolymers PP-I1, PP-I2 and PP-I3 are also commercially available, for instance as grades BA110CF, BD310MO and KSR4525, respectively, of Borealis.

The data of propylene copolymers PP-I1, PP-I2 and PP-I3 are summarized in Table 1.

Mineral Filler

As mineral filler commercially available fillers were used, i.e. as precipitated calcium carbonate "Socal U1S2" of Solvay, as ground calcium carbonate "Filmlink 520" of Imerys and as ground talcum grade "A3" of Luzenac. The weight average particle size and further data of these fillers are stated in Table 1 below:

TABLE 1

| Identifier | Material | MFR g/10 min | APS μm | Mw kg/mol | Mw(XCS) kg/mol | Ratio — | XCS wt.-% | C2 mol % | Grade | Producer |
|---|---|---|---|---|---|---|---|---|---|---|
| PP-I1 | PP Impact Copolymer | 1 | — | 626 | 349 | 1.79 | 16.5 | 13.8 | BA110CF | Borealis |
| PP-I2 | PP Impact Copolymer | 8 | — | 395 | 442 | 0.89 | 14.3 | 10.2 | BD310MO | Borealis |
| PP-I3 | PP Impact Copolymer | 6 | — | 365 | 492 | 0.74 | 28.3 | 24.6 | KSR4525 | Borealis |
| PCC | Precipitated Calcium Carbonate | — | 0.08 | — | — | — | — | — | Socal U1S2 | Solvay |
| GCC | Ground Calcium Carbonate | — | 0.9 | — | — | — | — | — | Filmlink 520 | Imerys |
| TALC | Ground Talcum | — | 0.6 | — | — | — | — | — | A3 | Luzenac |

MFR - Melt flow rate of polymer, ISO 1133, 230° C./2, 16 kg
APS - Weight average particle size of filler
XCS - Fraction of the polymer soluble in cold xylene
Mw-data - from high temperature SEC in TCB at 135° C.
Ratio - Mw/Mw(XCS)

As β-nucleating agent Ca pimelate and γ-quinacridone are used.

The propylene copolymers PP-I1, PP-I2 and PP-I3, the mineral fillers and the nucleating agents were melt mixed at a temperature between 200 and 260° C. in a twin-screw extruder in amounts shown in Table 2, which also shows the properties of the obtained propylene polymer compositions.

TABLE 2

| Ex. | Base Polymer | Filler Type | Filler Amt. wt.-% | Nucl. Type | NucL Amt. ppm | DSC Tm (β) ° C. | Hm(β) J/g | Tm(α) ° C. | Hm(α) J/g | β-fraction (DSC) % |
|---|---|---|---|---|---|---|---|---|---|---|
| E 1 | PP-I1 | PCC | 10 | Ca-Pim. | 1000 | 153.9 | 68.0 | 170.9 | 14.0 | 82.9 |
| E 2 | PP-I1 | GCC | 10 | Ca-Pim. | 1000 | 154 | 68.1 | 171.1 | 14.0 | 82.9 |
| E 3 | PP-I2 | PCC | 5 | Ca-Pim. | 1000 | 154 | 81.9 | 167.1 | 7.0 | 92.1 |
| E 4 | PP-I2 | PCC | 10 | Ca-Pim. | 1000 | 153.2 | 78.6 | 166.5 | 6.0 | 92.9 |
| E 5 | PP-I2 | PCC | 20 | Ca-Pim. | 1000 | 153.6 | 72.4 | 166.8 | 5.5 | 92.9 |
| E 6 | PP-I2 | GCC | 5 | Cinqu. | 50 | 153.3 | 82.5 | 166.2 | 5.8 | 93.4 |
| CE 1 | PP-I1 | None | 0 | None | 0 | — | — | 166.9 | 98.5 | 0.0 |
| CE 2 | PP-I1 | None | 0 | Ca-Pim. | 1000 | 153.7 | 75.4 | 170.9 | 16.0 | 82.5 |
| CE 3 | PP-I2 | None | 0 | None | 0 | — | — | 166.3 | 99.0 | 0.0 |
| CE 4 | PP-I2 | None | 0 | Ca-Pim. | 1000 | 153.2 | 76.1 | 167.1 | 15.8 | 82.8 |
| CE 5 | PP-I2 | TALC | 10 | Ca-Pim. | 1000 | — | — | 167.6 | 94.0 | 0.0 |
| CE 6 | PP-I3 | None | 0 | None | 0 | — | — | 166.1 | 97.0 | 0.0 |
| CE 7 | PP-I3 | GCC | 10 | None | 0 | — | — | 165.8 | 92.0 | 0.0 |
| CE 8 | PP-I3 | none | 0 | Ca-Pim. | 1000 | 153.0 | 76.2 | 166.8 | 15.2 | 83.4 |
| CE 9 | PP-I3 | GCC | 10 | Ca-Pim. | 1000 | 152.9 | 74.3 | 170.9 | 14.0 | 84.1 |

| Ex. | MFR 230° C./2, 16 kg G/10 min | Flex. Test Modulus MPa | ISO179 1eA + 23° C. kJ/m² | ISO179 1eA − 20° C. kJ/m² | Delta total % |
|---|---|---|---|---|---|
| E 1 | 0.9 | 1086 | 90.6 | 10.0 | 327 |
| E 2 | 0.9 | 1079 | 96.2 | 7.8 | 385 |
| E 3 | 7.6 | 1242 | 11.4 | 5.1 | 199 |
| E 4 | 7.4 | 1348 | 11.0 | 4.6 | 178 |

TABLE 2-continued

| E 5  | 7.4 | 1558 | 10.5 | 4.4 | 179 |
|------|-----|------|------|-----|-----|
| E 6  | 7.6 | 1250 | 12.2 | 5.2 | 214 |
| CE 1 | 1.0 | 1030 | 35.0 | 3.8 | 0   |
| CE 2 | 1.0 | 856  | 66.5 | 6.3 | 139 |
| CE 3 | 8   | 1204 | 8.1  | 2.0 | 0   |
| CE 4 | 8   | 988  | 10.6 | 4.6 | 143 |
| CE 5 | 8   | 2257 | 6.2  | 1.3 | 29  |
| CE 6 | 6   | 840  | 28.0 | 6.2 | 0   |
| CE 7 | 5.8 | 1230 | 24.2 | 4.2 | 1   |
| CE 8 | 5.8 | 692  | 29.2 | 6.1 | −15 |
| CE 9 | 5.8 | 770  | 24.6 | 4.5 | −48 |

Delta total = improvement of flexural strength + impact strength at +23° C. + impact strength at −20° C. [%]

E1 to E6 are Examples according to the invention, CE1 to CE9 are Comparative Examples.

As can be seen from Comparative Examples CE6 and CE9 in Table 2, when propylene copolymer PP-I3 with a $M_w/M_w$ (XCS) ratio of 0.74 is used, the flexural strength drops from 840 MPa to 770 Mpa. The flexural strength drops from 840 MPa to 770 MPa, the Charpy notched impact strength at +23° C. from 28.0 to 24.6 kJ/m$^2$ and at −20° C. from 6.2 to 4.5 kJ/m$^2$, when a filler (ground calcium carbonate) and a β-nucleating agent (Ca-pimelate) are added.

In contrast to that, as shown by Example E1 and Comparative Example CE1, the flexural strength increases from 1030 MPa to 1086 MPa, the Charpy impact strength at +23° C. from 35.0 to 90.6 kJ/m$^2$ and at −20° C. from 3.8 to 10.0 kJ/m$^2$ when the propylene copolymer PP-I1 according to the invention is used and the same filler (precipitated calcium carbonate) and β-nucleating agent (Ca-pimelate) with the same amounts are added.

The improvement obtained by the present invention becomes particularly evident when the "delta total" value is considered, i.e. the sum of the percent increases of the flexural modulus and the Charpy notched impact strength at +23° C. and the Charpy notched impact strength at −20° C. As can be seen from Examples E1 to Examples E6, delta total is between 178 to 385% according to the present invention, whereas it is only 143% or less according to Comparative Examples CE1 to CE9.

The invention claimed is:

1. A propylene polymer composition comprising
   A) 70 to 98 wt.-% of a heterophasic propylene copolymer with ethylene or an alpha-olefin with 4 to 12 carbon atoms, the propylene copolymer, which contains more than 60 wt.-% propylene, having a melt flow rate (MFR$_2$) of 0.5 to 50 g/10min and a ratio between elastomer molecular weight and total molecular weight expressed as $M_w/M_w$(XCS) of more than 0.8, $M_w$, being the weight average molecular weight of the propylene copolymer and $M_w$(XCS) being the weight average molecular weight of the propylene copolymer which is soluble in xylene at +23° C., and the propylene copolymer further containing a portion of 5 to 35 wt.-% soluble in xylene at +23° C. (XCS content), B) 2 to 30 wt.-% of calcium carbonate,
   C) 0.0001 to 1.0 wt.-% of a β-nucleating agent promoting the β-modification of the propylene copolymer, said composition having a content of β-modification of more than 50% determined by differential scanning calorimetry (DSC) and an impact strength at −20° C. which is at least 50% higher than the impact strength of the propylene copolymer (A).

2. The propylene polymer composition according to claim 1, wherein the heterophasic propylene copolymer (A) is a copolymer of propylene and ethylene containing less than 20 mol-% ethylene.

3. The propylene polymer composition according to claim 1, wherein the melt flow rate (MFR$_2$) of the propylene copolymer (A) is less than 15 g/10 min.

4. The propylene polymer composition according to claim 1, wherein the elastomer molecular weight and total molecular weight, $M_w/M_w$(XCS), ratio of propylene copolymer, is less than 5.

5. The propylene polymer composition according to claim 1, wherein the propylene copolymer (A) having a propylene copolymer which is soluble in xylene (XCS) content of 25 wt.-% or less.

6. The propylene polymer composition according to claim 1, wherein the mineral filler has an average particle size of 2 μm or less.

7. The propylene polymer composition according to claim 1, wherein the mineral filler is coated with a β-nucleating agent.

8. The propylene polymer composition according to claim 1, containing at least 0.001 wt.-% of the β-nucleating agent.

9. The propylene polymer composition according to claim 1, wherein the β-nucleating agent is 5,12-dihydro-quino(2,3-b)acridine-7,14-dione with quino(2,3-b)acridine-6,7,13,14 (5H, 12H)-tetrone, N,N'-dicyclohexyl-2,6-naphtalene dicarboxamide, a salt of dicarboxylic acids with at least 7 carbon atoms, or combination thereof.

10. A propylene polymer composition according to claim 9, wherein the metal of the salt of the dicarboxylic acid is an earth alkaline metal.

11. The propylene polymer composition according to claim 9, wherein the dicarboxylic acid is pimelate.

12. The propylene polymer composition according to claim 1, having a content of β-modification of more than 80%.

13. The propylene polymer composition according to claim 1 having an impact strength at −20° C. which is at least 100% higher than the impact strength of the propylene copolymer (A).

14. The propylene polymer composition according to claim 1 having an impact strength at −20° C. of more than 4 kJ/m$^2$.

15. The propylene polymer composition according to claim 1, having a flexural modulus of at least 1000 MPa.

16. The propylene polymer composition according to claim 1, wherein the sum of the percent increases of the impact strength at +23° C., the impact strength at −20° C. and the flexural modulus is at least 150% compared with propylene copolymer (A).

17. The propylene polymer composition according to claim 1, further comprising one or more conventional additives and/or stabilizers.

18. Housings or other parts of household appliances or white goods comprising the propylene polymer composition according to claim 1.

* * * * *